United States Patent
Watarai et al.

(10) Patent No.: US 12,486,889 B2
(45) Date of Patent: Dec. 2, 2025

(54) BALL SCREW DEVICE

(71) Applicant: NSK LTD., Tokyo (JP)

(72) Inventors: Yusuke Watarai, Kanagawa (JP); Kyohei Ikeda, Kanagawa (JP); Yuto Suzuki, Kanagawa (JP); Takayuki Yabe, Kanagawa (JP)

(73) Assignee: NSK LTD., Tokyo (JP)

( * ) Notice: Subject to any disclaimer, the term of this patent is extended or adjusted under 35 U.S.C. 154(b) by 270 days.

(21) Appl. No.: 18/282,860

(22) PCT Filed: Mar. 29, 2022

(86) PCT No.: PCT/JP2022/015349
§ 371 (c)(1),
(2) Date: Feb. 27, 2024

(87) PCT Pub. No.: WO2022/210677
PCT Pub. Date: Oct. 6, 2022

(65) Prior Publication Data
US 2025/0327511 A1    Oct. 23, 2025

(30) Foreign Application Priority Data

Mar. 31, 2021 (JP) .................................. 2021-062108

(51) Int. Cl.
*F16H 25/20* (2006.01)
*F16H 25/22* (2006.01)

(52) U.S. Cl.
CPC ..... *F16H 25/2204* (2013.01); *F16H 25/2015* (2013.01); *F16H 2025/2031* (2013.01);
(Continued)

(58) Field of Classification Search
CPC .......................... F16H 25/2015; F16H 25/2204
See application file for complete search history.

(56) References Cited

U.S. PATENT DOCUMENTS 3,404,580 A * 10/1968 Valenti ................ F16H 25/2056
74/89.35
5,092,539 A * 3/1992 Caero ................. F16H 25/2204
254/102
(Continued)

FOREIGN PATENT DOCUMENTS

JP    04-503562 A    6/1992
JP    08-159382 A    6/1996
JP    2020-46057 A   3/2020

OTHER PUBLICATIONS

International Search Report for PCT/JP2022/015349 dated Jun. 14, 2022.
(Continued)

*Primary Examiner* — Randell J Krug
(74) *Attorney, Agent, or Firm* — Sughrue Mion, PLLC (57) ABSTRACT

A ball screw device includes: a nut having a first track path; an outer circumferential screw shaft having a second track path and a third track path; a plurality of first balls disposed between the first track path and the second track path; an inner circumferential screw shaft having a fourth track path; a plurality of second balls disposed between the third track path and the fourth track path; a first stopper fixed closer to an end of the outer circumferential screw shaft in a first direction; a second stopper fixed closer to an end of the inner circumferential screw shaft in a second direction; and a third stopper fixed closer to an end of the outer circumferential screw shaft in the second direction. The track of the first ball and the track of the second ball are helixes running in a same direction.

4 Claims, 4 Drawing Sheets

(52) U.S. Cl.
CPC ............ *F16H 2025/2081* (2013.01); *F16H 2025/2096* (2013.01)

(56) References Cited

U.S. PATENT DOCUMENTS

| | | |
|---|---|---|
| 7,225,694 B2 | 6/2007 | Said |
| 8,656,798 B2 | 2/2014 | Kawahara et al. |
| 2015/0097455 A1* | 4/2015 | Ueyama ................ H02K 16/02 310/80 |
| 2019/0003562 A1* | 1/2019 | Hawksworth ....... F16H 25/2454 |

OTHER PUBLICATIONS

Extended European Search Report dated Mar. 5, 2025 in Application No. 22780888.8.

* cited by examiner

BALL SCREW DEVICE

This Application is a National Stage of International Application No. PCT/JP2022/015349 filed Mar. 29, 2022, claiming priority based on Japanese Patent Application No. 2021-062108 filed Mar. 31, 2021.

FIELD

The present invention relates to a ball screw device.

BACKGROUND

The ball screw device is a device that converts rotational motion into linear motion. Some ball screw device includes one nut and two coaxial screw shafts (refer to Patent Literature 1 below). Such a ball screw device has a larger amount of extension than a ball screw device having one screw shaft.

CITATION LIST

Patent Literature

Patent Literature 1: JP H08-159382 A

SUMMARY

Technical Problem

The ball screw device of the Patent Literature above includes a detector that detects a movement of the nut from the central portion of the screw shaft to the end of the screw shaft at the time of extension of the ball screw device. The detector issues a stop command to the motor before the nut is disengaged from the screw shaft. In a case of such a ball screw device, when the detector fails, the nut will be disengaged from the screw shaft. From the above situation, there is a demand for a ball screw device that can prevent separation (disengagement) between a nut and a screw shaft without including a detector, and further prevent separation (disengagement) between two screw shafts.

The present disclosure has been made in view of the above problem, and aims to provide a ball screw device that prevents separation between a nut and a screw shaft and prevents separation between two screw shafts at the time of extension of the device.

Solution to Problem

To achieve the above object, a ball screw device according to an embodiment of the present disclosure comprising: a housing; a nut rotatably supported by the housing and having a first track path on an inner circumferential surface; an outer circumferential screw shaft that is a cylindrical component penetrating the nut, has a second track path on an outer circumferential surface, and has a third track path on an inner circumferential surface; and a plurality of first balls disposed between the first track path and the second track path; an inner circumferential screw shaft extending in an axial direction parallel to the outer circumferential screw shaft, one end of the inner circumferential screw shaft pointing in a first direction and the other end of the inner circumferential screw shaft pointing in a second direction, the inner circumferential screw shaft being configured to be inserted into the outer circumferential screw shaft and having a fourth track path on an outer circumferential surface of the inner circumferential screw shaft; a plurality of second balls disposed between the third track path and the fourth track path; a first stopper fixed to an inner circumferential side of the outer circumferential screw shaft and closer to an end in the first direction; a second stopper fixed closer to an end of the inner circumferential screw shaft in the second direction; and a third stopper fixed closer to an end of the outer circumferential screw shaft in the second direction, wherein a track of the first ball and a track of the second ball are helixes running in a same direction, the first stopper includes a first protrusion that protrudes in the second direction and rotates together with a rotation of the outer circumferential screw shaft, the second stopper includes a second protrusion that protrudes in the first direction, enters a track along which the first protrusion rotates at a movement of the inner circumferential screw shaft in the first direction, and comes in contact with the first protrusion, the nut has a restriction protrusion that protrudes in the second direction and rotates together with the rotation of the nut, and the third stopper includes a third protrusion that protrudes in the first direction, enters a track along which the restriction protrusion rotates at a movement of the outer circumferential screw shaft in the first direction, and comes in contact with the restriction protrusion.

The first rolling path and the second rolling path form a helical shape running in the same direction. Therefore, when the nut rotates, the outer circumferential screw shaft and the inner circumferential screw shaft move in the same direction in the axial direction. When the inner circumferential screw shaft moves in the first direction by the rotation of the outer circumferential screw shaft, the second stopper also moves in the first direction. The second stopper enters the track of the rotation of the first protrusion of the first stopper and comes in contact with the first protrusion. This stops rotation of the outer circumferential screw shaft and suppresses the movement of the inner circumferential screw shaft in the first direction. This leads to avoidance of a case where the inner circumferential screw shaft further moves in the first direction and is disengaged from the outer circumferential screw shaft. In addition, when the outer circumferential screw shaft moves in the first direction by the rotation of the nut, the third stopper also moves in the first direction. The third stopper enters the track of the rotating restriction protrusion and comes in contact with the restriction protrusion. This stops the rotation of the nut and suppresses the movement of the outer circumferential screw shaft in the first direction. This leads to avoidance of a situation where the outer circumferential screw shaft further moves in the first direction and is disengaged from the nut.

As a desirable embodiment of the ball screw device, a force due to preload acts on the first ball and the second ball, and one of a preload force acting on the first ball and a preload force acting on the second ball is larger than the other of the preload force.

With this configuration, when the nut rotates, the ball having a lower preload force rolls, and then the ball having a higher preload force rolls. That is, one of the inner circumferential screw shaft and the outer circumferential screw shaft moves in the axial direction, and thereafter the other of the inner circumferential screw shaft and the outer circumferential screw shaft moves.

As a desirable embodiment of the ball screw device, a lead of the first track path or the second track path is equal to a lead of the third track path or the fourth track path.

With this configuration, the moving speed in the axial direction of the inner circumferential screw shaft is equal to the moving speed in the axial direction of the outer circumferential screw shaft. This stabilizes the posture of the workpiece conveyed by the movement of the inner circumferential screw shaft and the outer circumferential screw shaft.

As a desirable embodiment of the ball screw device, at least one of the first stopper, the second stopper, and the third stopper is a screw component fixed by screwing, and a thread groove to which the screw component is screwed runs in a direction opposite to a helix of the first track path.

With this configuration, the screwed state of the screwing member is not loosened even with an action of the rotational torque of the nut.

Advantageous Effects of Invention

According to the ball screw device of the present disclosure, the inner circumferential screw shaft and the outer circumferential screw shaft are not separated from each other at the time of extension of the device. In addition, the outer circumferential screw shaft and the nut are not separated from each other.

DESCRIPTION OF EMBODIMENTS

Hereinafter, the present invention will be described in detail with reference to the drawings. Note that the present invention is not limited by the following mode for carrying out the invention (hereinafter, referred to as an embodiment). In addition, constituents in the following embodiments include those easily conceivable by those skilled in the art, those that are substantially the same, and those within an equivalent range. Furthermore, the constituents disclosed in the following embodiments can be appropriately combined with each other.

Figure 1:
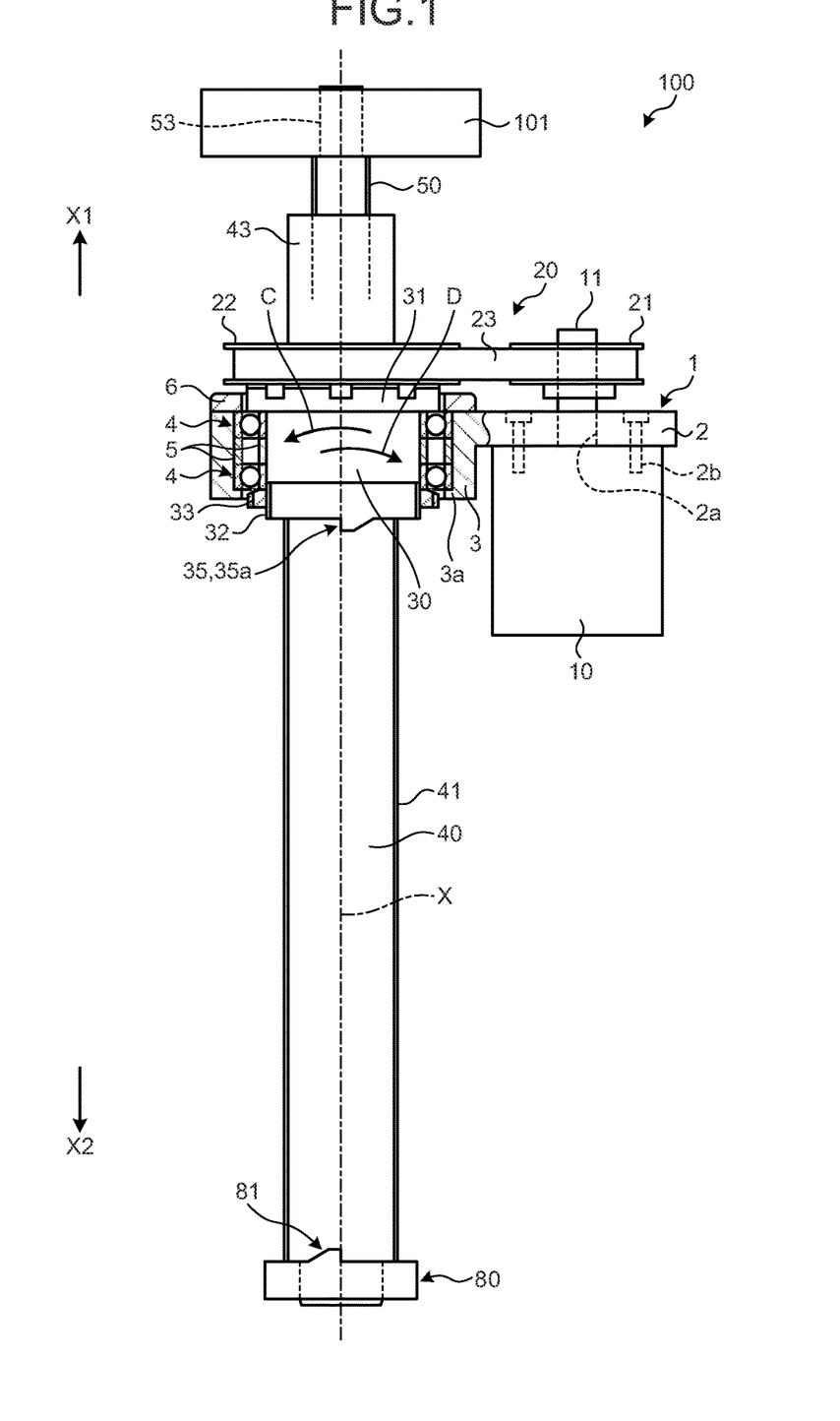
FIG. 1 is an overall view illustrating a ball screw device according to an embodiment at the time of contraction.
Figure 2:
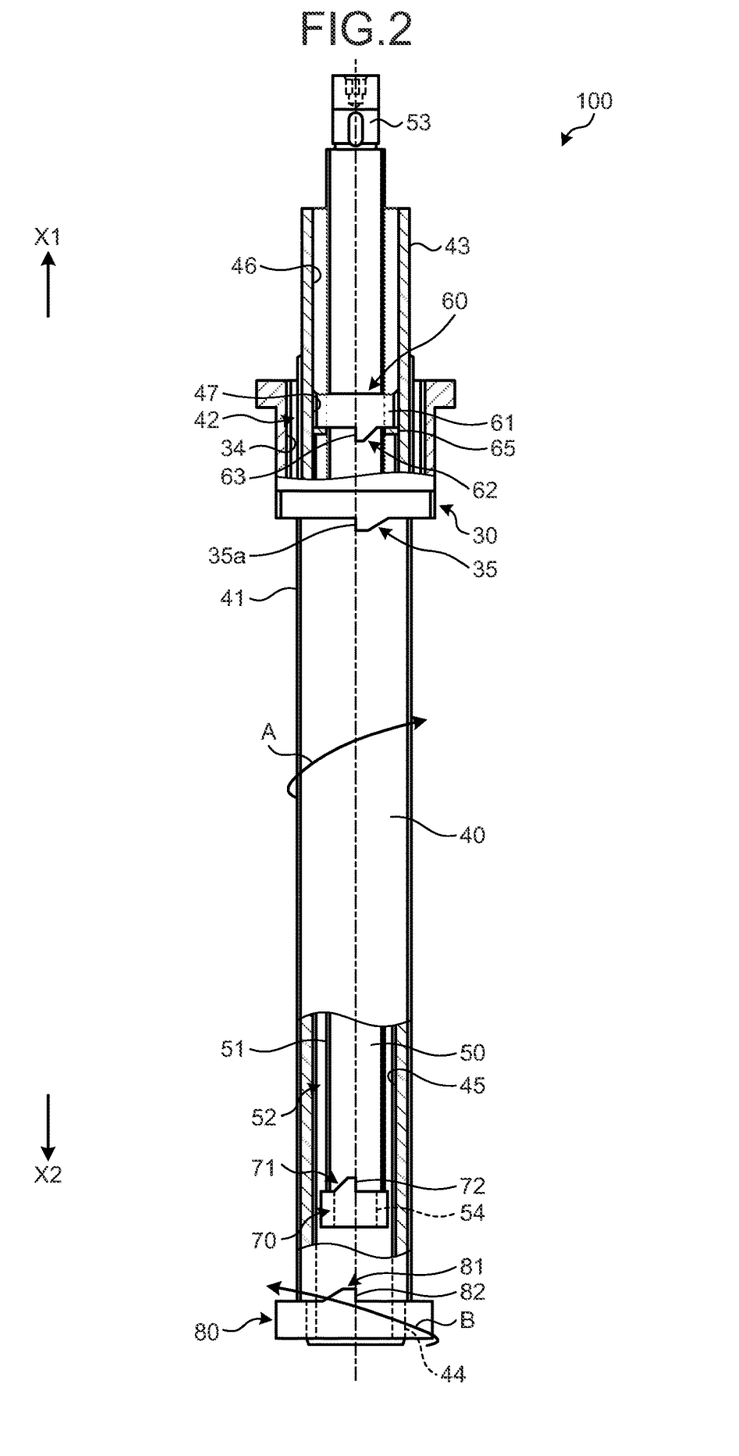
FIG. 2 is a partial cross-sectional view of a nut, an outer circumferential screw shaft, and an inner circumferential screw shaft, extracted from a ball screw device.
Figure 3:
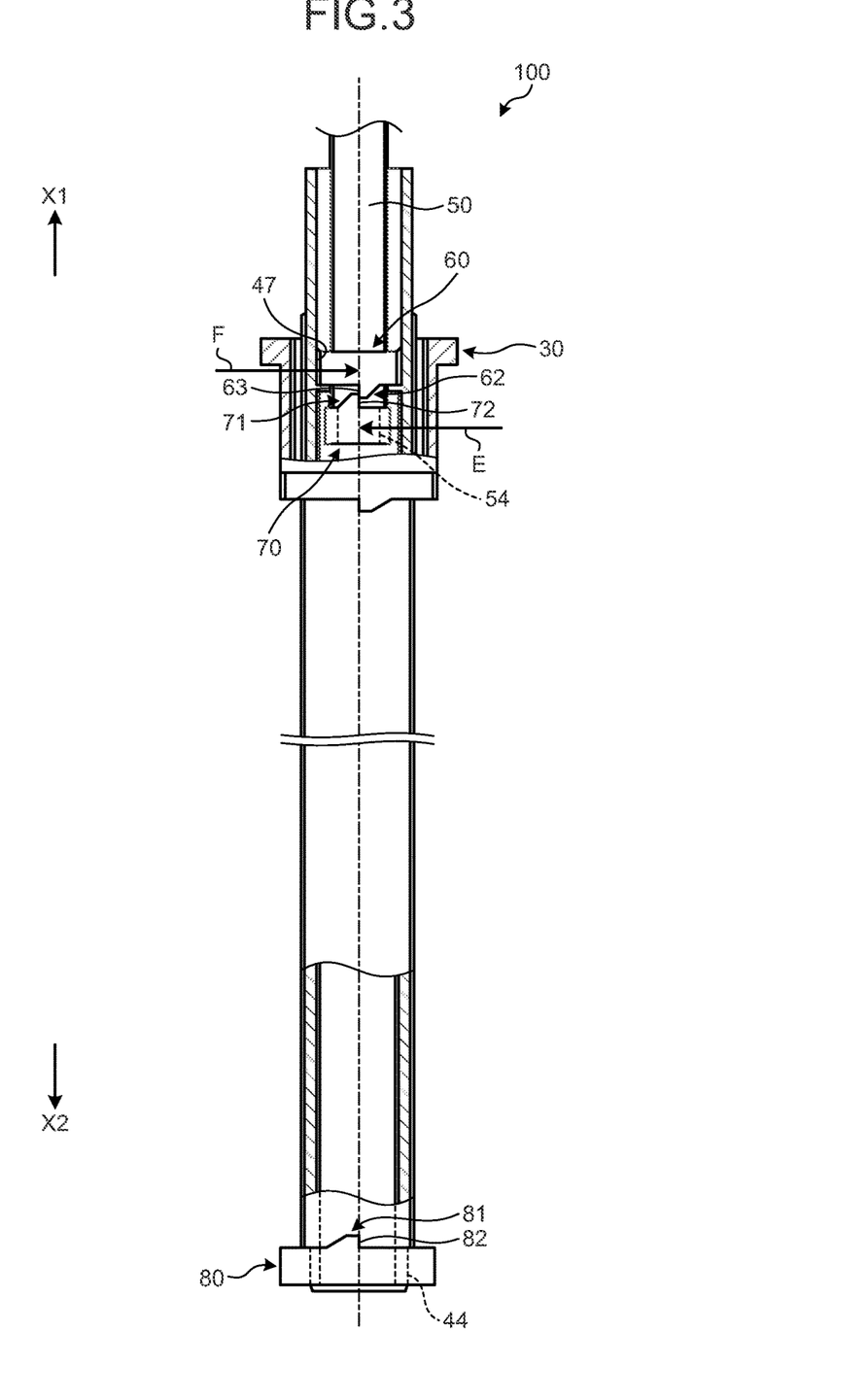
FIG. 3 is a partial cross-sectional view illustrating a state in which an inner circumferential screw shaft has moved in a first direction, bringing a first stopper and a second stopper into contact with each other.
Figure 4:
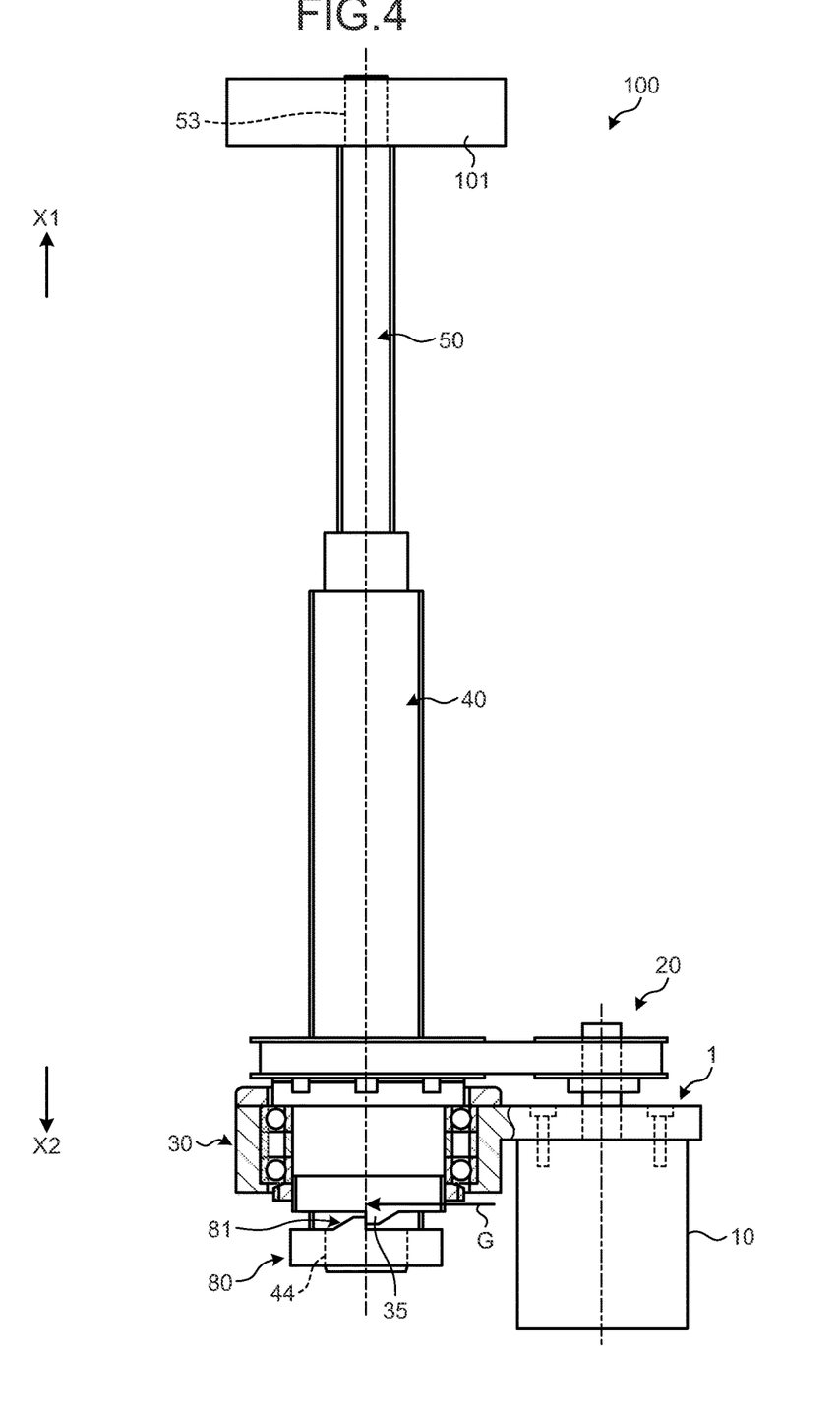
FIG. 4 is an overall view illustrating an extended state of a ball screw device according to the embodiment.

FIG. 1 is an overall view illustrating a ball screw device according to an embodiment at the time of contraction. FIG. 2 is a partial cross-sectional view of a nut, an outer circumferential screw shaft, and an inner circumferential screw shaft, extracted from a ball screw device. FIG. 3 is a partial cross-sectional view illustrating a state in which an inner circumferential screw shaft has moved in a first direction, bringing a first stopper and a second stopper in contact with each other. FIG. 4 is an overall view illustrating an extended state of a ball screw device according to the embodiment.

Embodiment

As illustrated in FIG. 1, a ball screw device 100 of the present embodiment includes a housing 1, a motor 10, a power transmission component 20, a nut 30, an outer circumferential screw shaft 40, an inner circumferential screw shaft 50, a plurality of first balls (not illustrated), a plurality of second balls (not illustrated), a first stopper 60 (refer to FIG. 2), a second stopper 70 (refer to FIG. 2), and a third stopper 80. The ball screw device 100 of the embodiment has a table 101 fixed to an end of the inner circumferential screw shaft 50 so as to convey a workpiece (not illustrated) placed on the table 101. That is, the ball screw device 100 of the embodiment constitutes a part of a conveyance device (not illustrated).

In the following description, a direction parallel to an extending direction of the outer circumferential screw shaft 40 is referred to as an axial direction. One of the axial direction, specifically, a direction in which the table 101 is disposed as viewed from the housing 1, is referred to as a first direction X1. Further, the other of the axial direction, specifically, a direction opposite to the first direction X1, is referred to as a second direction X2.

The housing 1 includes: a motor fixture base 2 to which the motor 10 is fixed; and a tubular portion 3 that supports the nut 30. The motor fixture base 2 has a plate shape and extends in a direction orthogonal to the axial direction. The motor fixture base 2 has a through hole 2a penetrating in the axial direction. The motor 10 is disposed in the second direction X2 with respect to the motor fixture base 2. An output shaft 11 of the motor 10 is inserted into the through hole 2a and penetrates through the motor fixture base 2. The motor fixture base 2 and the motor 10 are fastened to and integrated with a bolt 2b.

The tubular portion 3 is disposed adjacent to the motor fixture base 2 in a direction orthogonal to the axial direction. The inner circumferential surface of the tubular portion 3 has a circular shape when viewed in the axial direction. Outer rings of ball bearings 4 and 4 are fitted to the inner circumferential surface of the tubular portion 3. The ball bearings 4 and 4 are spaced apart from each other in the axial direction across a spacer 5. At an end of the inner circumferential surface of the tubular portion 3 in the second direction X2, there is provided a collar 3a protruding inward in the radial direction. On an end surface of the tubular portion 3 in the first direction X1, there is provided a fixture member 6 having an annular shape and fixed by a bolt (not illustrated). The outer rings of the ball bearings 4 and 4 are sandwiched in the axial direction by the collar 3a and the fixture member 6.

The power transmission component 20 includes a driving pulley 21, a driven pulley 22, and a belt 23. The driving pulley 21 is fixed to the output shaft 11 of the motor 10. The driven pulley 22 is disposed in the first direction X1 of the fixture member 6 and faces a flange 31 of the nut 30 in the axial direction. The driven pulley 22 is fixed to the flange 31 of the nut 30 by a bolt (not illustrated). The driven pulley 22 has a tubular shape. The outer circumferential screw shaft 40 penetrates the inside of the driven pulley 22. The belt 23 is an annular endless belt, and is stretched across the driving pulley 21 and the driven pulley 22.

The nut 30 is disposed inside the tubular portion 3. The outer circumferential surface of the nut 30 is fitted to inner rings of the ball bearings 4 and 4. Therefore, the nut 30 is supported by the housing 1 so as to be rotatable about an axis X. At an end of the outer circumferential surface of the nut 30 in the first direction X1, the flange 31 protrudes outward in a radial direction. At an end of the outer circumferential surface of the nut 30 in the second direction X2, there is provided a male screw portion 32. The male screw portion 32 is screwed to a lock nut 33. The flange 31 and the lock nut 33 sandwich the inner rings of the ball bearings 4 and 4 in the axial direction.

As illustrated in FIG. 2, on the inner circumferential surface of the nut 30, there is provided a first track path 34.

On an end surface of the nut 30 in the second direction X2, there is provided a restriction protrusion 35 protruding in the second direction X2. One of side surfaces of the restriction protrusion 35 facing the circumferential direction, specifically, a left side surface 35a facing counterclockwise when the restriction protrusion 35 is viewed in the second direction X2 extends in the axial direction.

The outer circumferential screw shaft 40 is a cylindrical shaft component. The outer circumferential screw shaft 40 penetrates through the nut 30. On the outer circumferential surface of the outer circumferential screw shaft 40, there is provided a second track path 41 facing the first track path 34 of the nut 30. A space between the first track path 34 and the second track path 41 makes a first track 42 having a helical shape. The first track 42 includes a plurality of first balls (not illustrated). Although not illustrated in particular, the nut 30 includes a plurality of internal deflectors. The first ball circulates on the first track 42 by the plurality of internal deflectors. The ball screw device of the present disclosure is not limited to the internal deflector type circulation system. It is also allowable to employ the types such as end deflector type, a tube type, or an end cap type.

As illustrated in FIG. 1, an outer circumferential surface of an end of the outer circumferential screw shaft 40 in the first direction X1 makes a circular outer circumferential surface 43 having a circular shape in a cross-sectional view. That is, the second track path 41 is not provided closer to the end in the first direction X1 on the outer circumferential surface of the outer circumferential screw shaft 40. As illustrated in FIG. 2, a tubular protrusion 44 protruding in the second direction X2 is provided on an end surface of the outer circumferential screw shaft 40 in the second direction X2. On the outer circumferential surface of the tubular protrusion 44, there is provided a reverse thread groove (not illustrated).

On the inner circumferential surface of the outer circumferential screw shaft 40, there is provided a third track path 45. The third track path 45 is formed on an inner circumferential surface of the outer circumferential screw shaft 40 in the first direction X1 from the end in the second direction X2. However, the third track path 45 is not provided at the end in the first direction X1 on the inner circumferential surface of the outer circumferential screw shaft 40. Therefore, the end of the inner circumferential surface of the outer circumferential screw shaft 40 in the first direction X1 makes a circular inner circumferential surface 46 having a circular shape in a cross-sectional view. In addition, there is provided a reverse thread groove 47 between the circular inner circumferential surface 46 of the inner circumferential surface of the outer circumferential screw shaft 40 and the third track path 45.

The inner circumferential screw shaft 50 is a solid shaft component, having one end pointing in the first direction X1 and the other end pointing in the second direction X2. An outer diameter of the inner circumferential screw shaft 50 is smaller than an inner diameter of the outer circumferential screw shaft 40. On the outer circumferential surface of the inner circumferential screw shaft 50, there is provided a fourth track path 51 facing the third track path 45. The portion between the third track path 45 and the fourth track path 51 makes a second track 52 having a helical shape. The second track 52 includes a plurality of second balls (not illustrated). Although not illustrated in particular, the outer circumferential screw shaft 40 includes a plurality of internal deflectors. The second ball circulates on the second track 52 by the plurality of internal deflectors. The ball screw device of the present disclosure is not limited to the internal deflector type circulation system, and may adopt an end deflector type or an end cap type.

On an end surface of the inner circumferential screw shaft 50 in the first direction X1, there is provided a joint 53 protruding in the first direction X1. The joint 53 is a portion integrated with the table 101 by a bolt (not illustrated). The table 101 is supported by the components of the conveyance device so as not to rotate about the axis X. Accordingly, the inner circumferential screw shaft 50 is not rotatable via the table 101. On an end surface of the inner circumferential screw shaft 50 in the second direction X2, there is provided a protrusion 54 protruding in the second direction X2. On the outer circumferential surface of the protrusion 54, there is provided a reverse thread groove (not illustrated).

The first stopper 60, the second stopper 70, and the third stopper 80 are cylindrical components each. The first stopper 60, the second stopper 70, and the third stopper 80 are screw components fixed, by screwing, to the outer circumferential screw shaft 40 or the inner circumferential screw shaft 50.

The first stopper 60 is disposed on the inner circumferential side of the reverse thread groove 47 of the outer circumferential screw shaft 40. On an outer circumferential surface of the first stopper 60, there is provided a male screw portion 61. The male screw portion 61 of the first stopper 60 is screwed to the reverse thread groove 47. This allows the first stopper 60 to be integrated with the outer circumferential screw shaft 40. On an end surface of the first stopper 60 in the second direction X2, there is provided a first protrusion 62 protruding in the second direction X2. One of side surfaces of the first protrusion 62 facing the circumferential direction, specifically, a left side surface 63 facing counterclockwise when viewed in the second direction X2 extends in the axial direction. The inner diameter of the first stopper 60 is larger than the outer diameter of the inner circumferential screw shaft 50. Accordingly, the first stopper 60 does not come into contact with the outer circumferential surface of the inner circumferential screw shaft 50. In addition, there is a shim 65 interposed in the second direction X2 of the first stopper 60. With this configuration, the position of the first stopper 60 in the axial direction is adjusted.

The protrusion 54 of the inner circumferential screw shaft 50 is inserted into the second stopper 70. On an inner circumferential surface of the second stopper 70, there is provided a female screw portion (not illustrated). The female screw portion of the second stopper 70 is screwed to the reverse thread groove of the protrusion 54 of the inner circumferential screw shaft 50. This allows the second stopper 70 to be fixed to the end of the inner circumferential screw shaft 50 in the second direction X2. On an end surface of the second stopper 70 in the first direction, there is provided a second protrusion 71 protruding in the first direction X1. One of side surfaces of the second protrusion 71 facing the circumferential direction, specifically, a right side surface 72 facing clockwise when viewed in the second direction X2 extends in the axial direction. The second stopper 70 has an outer diameter larger than the outer diameter of the inner circumferential screw shaft 50. Therefore, the second stopper 70 protrudes outward in the radial direction from the outer circumferential surface of the inner circumferential screw shaft 50. The second stopper 70 has an outer diameter smaller than the inner diameter of the outer circumferential screw shaft 40. Accordingly, the second stopper 70 does not come into contact with the inner circumferential surface of the outer circumferential screw shaft 40.

The third stopper 80 is disposed at an end of the outer circumferential screw shaft 40 in the second direction X2, and has the tubular protrusion 44 inserted therein. On an inner circumferential surface of the third stopper 80, there is provided a female screw portion (not illustrated). The female screw portion of the third stopper 80 is screwed to the reverse thread groove of the tubular protrusion 44. On an end surface of the third stopper 80 in the first direction X1, there is provided a third protrusion 81 protruding in the first direction X1. One of side surfaces of the third protrusion 81 facing the circumferential direction, specifically, a right side surface 82 facing clockwise when viewed in the second direction X2 extends in the axial direction. The third stopper 80 has an outer diameter larger than the outer diameter of the outer circumferential screw shaft 40. Therefore, the third stopper 80 protrudes outward in the radial direction from the outer circumferential surface of the outer circumferential screw shaft 40. The third stopper 80 has an outer diameter larger than the inner diameter of the nut 30.

Next, details of the first track path 34, the second track path 41, the third track path 45, and the fourth track path 51 will be described. Each of the first track path 34, the second track path 41, the third track path 45, and the fourth track path 51 is a helix that runs in the first direction X1 along with a turning of the ball screw device 100 clockwise when viewed in the second direction X2 (refer to arrow A1 in FIG. 2). In other words, the first track 42 and the second track 52 form a helical shape in the same direction.

With this configuration, when the nut 30 rotates counterclockwise as viewed in the second direction X2 (refer to arrow C in FIG. 1), the outer circumferential screw shaft 40 moves in the first direction X1. In addition, when the outer circumferential screw shaft 40 rotates counterclockwise as viewed in the second direction X2 (refer to arrow C in FIG. 1), the inner circumferential screw shaft 50 moves in the first direction X1. On the other hand, when the nut 30 rotates clockwise as viewed in the second direction X2 (refer to arrow D in FIG. 1), the outer circumferential screw shaft 40 moves in the second direction X2. In addition, when the outer circumferential screw shaft 40 rotates clockwise as viewed in the second direction X2 (refer to arrow D in FIG. 1), the inner circumferential screw shaft 50 moves in the second direction X2. That is, when the nut 30 and the outer circumferential screw shaft 40 rotate in the same direction, the outer circumferential screw shaft 40 and the inner circumferential screw shaft 50 also move in the same direction.

In addition, the second track path 41 and the third track path 45 have the same lead size. In other words, the leads in the first track 42 and the second track 52 are the same. With this configuration, the movement amount of the outer circumferential screw shaft 40 in the axial direction when the nut 30 makes one rotation is equal to the movement amount of the inner circumferential screw shaft 50 in the axial direction when the outer circumferential screw shaft 40 makes one rotation.

On the other hand, in each lead of the first track path 34, one lead located at the central portion in the axial direction is set to be larger than the other leads in the axial direction. That is, the first track path 34 is offset outward from the central portion in the axial direction. Therefore, the first ball is in a state having a force of pressing outward in the axial direction acting from the central portion of the first track path in the axial direction and having a preload being applied.

Similarly, in each lead of the fourth track path 51 of the inner circumferential screw shaft 50, one lead located at the central portion in the axial direction is set to be larger than the other leads in the axial direction. That is, the fourth track path 51 is offset outward from the central portion in the axial direction. Therefore, the second ball is in a state having a force of pressing outward in the axial direction acting from the central portion of the fourth track path 51 in the axial direction and having a preload being applied.

The preload force acting on the first ball is larger than the preload force acting on the second ball. With this configuration, even with torque acting on the first ball and the second ball at the rotation of the nut 30, the second ball easily rolls more than the first ball.

Next, the direction of screwing in which the first stopper 60, the second stopper 70, and the third stopper 80 are fixed will be described. The reverse thread groove 47 to which the first stopper 60 is screwed makes a helix that moves in the first direction X1 (refer to arrow B in FIG. 2) along with a turning counterclockwise as viewed in the second direction X2. The reverse thread groove 47 is a helix made in a direction opposite to the first track 42 and the second track 52. Similarly, a reverse thread groove (not illustrated) of the protrusion 54 to which the second stopper 70 is screwed and a reverse thread groove (not illustrated) of the tubular protrusion 44 to which the third stopper 80 is screwed are helixes (refer to arrow B in FIG. 2) that move in the first direction X1 along with the turning counterclockwise as viewed in the second direction X2.

Next, motions of the ball screw device 100 will be described. When the motor 10 is activated, a rotational motion of the output shaft 11 is transmitted to the nut 30 via the power transmission component 20. As illustrated in FIG. 1, when the nut 30 rotates counterclockwise (refer to arrow C in FIG. 1) as viewed in the second direction from a contracted state, counterclockwise torque acts on the outer circumferential screw shaft 40 and the inner circumferential screw shaft 50.

As described above, the preload force of the first ball is higher than the preload force of the second ball. Therefore, the torque acting from the nut 30 does not cause the first ball to roll but causes the second ball to roll. That is, the torque acting from the nut 30 causes the outer circumferential screw shaft 40 to rotate together with the nut 30 counterclockwise (refer to arrow C in FIG. 1) as viewed in the second direction. On the other hand, the second ball rolls, and the inner circumferential screw shaft 50 moves in the first direction X1. The rotation of the outer circumferential screw shaft 40 causes the first stopper 60 and the third stopper 80 to rotate counterclockwise (refer to arrow C in FIG. 1) as viewed in the second direction.

As illustrated in FIG. 3, when the end of the inner circumferential screw shaft 50 in the second direction X2 moves toward the end of the outer circumferential screw shaft 40 in the first direction X1, the second stopper 70 comes close to the first stopper 60. The second protrusion 71 of the second stopper 70 enters the track of the first protrusion 62 of the rotating first stopper 60. The right side surface 72 of the second protrusion 71 comes in contact with the left side surface 63 of the first protrusion 62. This restricts the rotation of the outer circumferential screw shaft 40 in the counterclockwise direction (refer to arrow C in FIG. 1) as viewed in the second direction X2 and allows only the nut 30 to continue the rotation. Therefore, the first ball rolls, and the outer circumferential screw shaft 40 starts to move in the first direction X1.

As described above, the movement amount of the outer circumferential screw shaft 40 in the axial direction when the nut 30 makes one rotation is equal to the movement amount of the inner circumferential screw shaft 50 in the axial direction when the outer circumferential screw shaft 40 makes one rotation. That is, the moving speeds of the inner circumferential screw shaft 50 and the outer circumferential screw shaft 40 in the axial direction are the same. Therefore, even when the movement in the axial direction is switched from the inner circumferential screw shaft 50 to the outer circumferential screw shaft 40, the moving speed of the table 101 is constant. Therefore, the workpiece placed on the table 101 is stably conveyed without losing the posture.

As illustrated in FIG. 4, when the end of the outer circumferential screw shaft 40 in the second direction X2 moves toward the nut 30, the third stopper 80 comes close to the nut 30. The third protrusion 81 of the third stopper 80 enters the track of the rotating restriction protrusion 35. The right side surface 82 of the third protrusion 81 comes in contact with the left side surface 35*a* of the restriction protrusion 35. This restricts the rotation of the nut 30 in the counterclockwise direction (refer to arrow C in FIG. 1) as viewed in the second direction X2. That is, the movement of the outer circumferential screw shaft 40 in the first direction X1 is stopped.

As described above, at the time of extension of the ball screw device 100, disengagement of the inner circumferential screw shaft 50 from the outer circumferential screw shaft 40 in the first direction X1 is restricted. In addition, disengagement of the outer circumferential screw shaft 40 from the nut 30 in the first direction X1 is restricted.

Incidentally, when the nut 30 rotates clockwise (refer to arrow D in FIG. 1) as viewed in the second direction X2, the nut starts to roll from the second ball having a low preload force similarly to the case of extension. Therefore, the inner circumferential screw shaft 50 moves in the second direction X2, and thereafter the outer circumferential screw shaft 40 moves in the second direction X2. That is, when the nut 30 rotates, the ball screw device 100 first moves from the inner circumferential screw shaft 50, and then the outer circumferential screw shaft 40 moves.

In addition, as illustrated in FIG. 3, when the first stopper 60 and the second stopper 70 are in contact with each other, torque in the rotation direction of the nut 30 (refer to arrow E in FIG. 3) acts on the second stopper 70. Here, the direction of the screwing of the second stopper 70 with respect to the protrusion 54 corresponds to a helix that moves in the first direction X1 along with the turning counterclockwise as viewed in the second direction X2 (refer to arrow B in FIG. 2). Therefore, even with torque received from the first stopper 60, the screwing of the second stopper 70 with respect to the protrusion 54 is not loosened. Therefore, the second stopper 70 will not be disengaged from the protrusion 54.

Similarly, although the first stopper 60 receives a reaction torque (refer to arrow F in FIG. 3) from the second stopper 70, the direction of the screwing of the first stopper 60 with respect to the reverse thread groove 47 corresponds to a helix that moves in the first direction along with a turning counterclockwise as viewed in the second direction (refer to arrow B in FIG. 2). Therefore, even with a reaction torque received from the second stopper 70, the screwing of the first stopper 60 with respect to the reverse thread groove 47 is not loosened. Therefore, the second stopper 70 will not be disengaged from the outer circumferential screw shaft 40.

Furthermore, when the third stopper 80 and the restriction protrusion 35 of the nut come in contact with each other, there is an action of torque in the rotation direction of the nut (refer to arrow G in FIG. 4). Here, the direction of the screwing of the third stopper 80 with respect to the tubular protrusion 44 corresponds to a helix that moves in the first direction X1 along with the turning counterclockwise as viewed in the second direction X2 (refer to arrow B in FIG. 2). Therefore, even with a torque received from the restriction protrusion 35, the screwing of the third stopper 80 with respect to the tubular protrusion 44 is not loosened. Therefore, the third stopper 80 will not be disengaged from the tubular protrusion 44.

As described above, the ball screw device 100 according to the embodiment includes: the housing 1; the nut 30 rotatably supported by the housing 1 and having the first track path 34 on its inner circumferential surface; the outer circumferential screw shaft 40 being a cylindrical component penetrating through the nut 30 and having the second track path 41 on its outer circumferential surface and having the third track path 45 on its inner circumferential surface; the plurality of first balls disposed between the first track path 34 and the second track path 41; the inner circumferential screw shaft 50 extending in the axial direction parallel to the outer circumferential screw shaft 40, having one end pointing in the first direction X1 and the other end pointing in the second direction X2, being inserted into the outer circumferential screw shaft 40 and having the fourth track path 51 on its outer circumferential surface; the plurality of second balls disposed between the third track path 45 and the fourth track path 51; the first stopper 60 fixed to the inner circumferential side of the outer circumferential screw shaft 40 and closer to the end in the first direction X1; the second stopper 70 fixed to the inner circumferential screw shaft 50 closer to the end in the second direction X2; and the third stopper 80 fixed to the outer circumferential screw shaft 40 closer to the end in the second direction X2. The track (first track 42) of the first ball and the track (second track 52) of the second ball are helixes running in the same direction. The first stopper 60 has the first protrusion 62 that protrudes in the second direction X2 and rotates together with the rotation of the outer circumferential screw shaft 40. The second stopper 70 has the second protrusion 71 that protrudes in the first direction X1, enters the track of the rotation of the first protrusion 62 when the inner circumferential screw shaft 50 moves in the first direction X1, and comes in contact with the first protrusion 62. The nut 30 has the restriction protrusion 35 that protrudes in the second direction X2 and rotates together with the rotation of the nut 30. The third stopper 80 has a third protrusion 81 that protrudes in the first direction X1, enters the track along which the restriction protrusion 35 rotates when the outer circumferential screw shaft 40 moves in the first direction X1, and comes in contact with the restriction protrusion 35.

According to the above configuration, the outer circumferential screw shaft 40 and the inner circumferential screw shaft 50 are not separated from each other at the time of extension of the ball screw device 100. In addition, the nut 30 and the outer circumferential screw shaft 40 are not separated from each other.

Further, a force due to preload acts on the first ball and the second ball of the ball screw device 100 of the embodiment. One of the preload force acting on the first ball and the preload force acting on the second ball is higher than the other. In the embodiment, the preload force acting on the first ball is higher than the preload force acting on the second ball.

According to the above configuration, the rotation of the nut first causes the inner circumferential screw shaft 50 to move. After the movement of the inner circumferential screw shaft 50 is restricted, the outer circumferential screw shaft 40 moves.

In addition, in the ball screw device 100 of the embodiment, the lead of the first track path 34 or the second track path 41 is equal to the lead of the third track path 45 or the fourth track path 51. In the embodiment, the second track path 41 and the third track path 45 have the same lead.

According to the above configuration, even when the movement of the inner circumferential screw shaft 50 is switched to the movement of the outer circumferential screw shaft 40, the moving speed of the table 101 is constant, making it possible for the workpiece placed on the table 101 to be conveyed without losing the posture.

Further, in the ball screw device 100 of the embodiment, at least one of the first stopper 60, the second stopper 70, and the third stopper 80 is a screw component fixed by screwing. The thread groove to which the screw component is screwed runs in the direction opposite to the direction of the helix of the first track path 34. In the embodiment, all of the first stopper 60, the second stopper 70, and the third stopper 80 are screw components.

According to the above configuration, the screwing is not loosened even with the torque of the nut 30.

Although the embodiment has been described above, the ball screw device of the present disclosure is not limited to the description. The first stopper 60, the second stopper 70, and the third stopper 80 may be fixed by an adhesive or by welding. The leads of the first track path 34 and the second track path 41 need not be equal to the leads of the third track path 45 and the fourth track path 51. The preload force acting on the first ball may be lower than the preload force acting on the second ball. With this configuration, the rotation of the nut first causes the outer circumferential screw shaft 40 to move. After the movement of the outer circumferential screw shaft 40 is restricted, the inner circumferential screw shaft 50 moves.

Although the embodiment adopts the offset method as a method of applying preload, the present disclosure is not limited to this method. As long as the load can be applied to the first ball and the second ball, it is also allowable to adopt a double nut method of sandwiching a spacer between two nuts, a spring type double nut method of sandwiching a spring between two nuts, or an oversize ball method using a ball larger in size than the space of the first track 42 or the second track 52. When the offset system is adopted, the leads of the second track path 41 and the third track path 45 may be offset instead of the first track path 34 and the fourth track path 51.

REFERENCE SIGNS LIST

1 HOUSING
10 MOTOR
20 POWER TRANSMISSION COMPONENT
30 NUT
40 OUTER CIRCUMFERENTIAL SCREW SHAFT
50 INNER CIRCUMFERENTIAL SCREW SHAFT
60 FIRST STOPPER
70 SECOND STOPPER
80 THIRD STOPPER
100 BALL SCREW DEVICE
101 TABLE
34 FIRST TRACK PATH
35 RESTRICTION PROTRUSION
35a LEFT SIDE SURFACE
41 SECOND TRACK PATH
42 FIRST TRACK 44 TUBULAR PROTRUSION 45 THIRD TRACK PATH 47 REVERSE THREAD GROOVE 51 FOURTH TRACK PATH 52 SECOND TRACK 54 PROTRUSION 62 FIRST PROTRUSION 63 LEFT SIDE SURFACE 71 SECOND PROTRUSION 72 RIGHT SIDE SURFACE 81 THIRD PROTRUSION 82 RIGHT SIDE SURFACE

The invention claimed is:

1. A ball screw device comprising:
a housing;
a nut rotatably supported by the housing and having a first track path on an inner circumferential surface;
an outer circumferential screw shaft that is a cylindrical component penetrating the nut, has a second track path on an outer circumferential surface, and has a third track path on an inner circumferential surface; and
a plurality of first balls disposed between the first track path and the second track path;
an inner circumferential screw shaft extending in an axial direction parallel to the outer circumferential screw shaft, one end of the inner circumferential screw shaft pointing in a first direction and the other end of the inner circumferential screw shaft pointing in a second direction, the inner circumferential screw shaft being configured to be inserted into the outer circumferential screw shaft and having a fourth track path on an outer circumferential surface of the inner circumferential screw shaft;
a plurality of second balls disposed between the third track path and the fourth track path;
a first stopper fixed to an inner circumferential side of the outer circumferential screw shaft and closer to an end in the first direction;
a second stopper fixed closer to an end of the inner circumferential screw shaft in the second direction; and
a third stopper fixed closer to an end of the outer circumferential screw shaft in the second direction,
wherein a track of the first ball and a track of the second ball are helixes running in a same direction,
the first stopper includes a first protrusion that protrudes in the second direction and rotates together with a rotation of the outer circumferential screw shaft,
the second stopper includes a second protrusion that protrudes in the first direction, enters a track along which the first protrusion rotates at a movement of the inner circumferential screw shaft in the first direction, and comes in contact with the first protrusion,
the nut has a restriction protrusion that protrudes in the second direction and rotates together with the rotation of the nut, and
the third stopper includes a third protrusion that protrudes in the first direction, enters a track along which the restriction protrusion rotates at a movement of the outer circumferential screw shaft in the first direction, and comes in contact with the restriction protrusion.

2. The ball screw device according to claim 1,
wherein a force due to preload acts on the first ball and the second ball, and
one of a preload force acting on the first ball and a preload force acting on the second ball is larger than the other of the preload force.

3. The ball screw device according to claim 2,
wherein a lead of the first track path or the second track path is equal to a lead of the third track path or the fourth track path.

4. The ball screw device according to claim 1,
wherein at least one of the first stopper, the second stopper, and the third stopper is a screw component fixed by screwing, and a thread groove to which the screw component is screwed runs in a direction opposite to a helix of the first track path.

* * * * *